April 5, 1927.

G. B. SHERMAN 1,623,560

MOLDING APPARATUS.

Filed July 11, 1925   5 Sheets-Sheet 5

INVENTOR.
George B. Sherman
BY
ATTORNEY.

Patented Apr. 5, 1927.

1,623,560

UNITED STATES PATENT OFFICE.

GEORGE B. SHERMAN, OF FLINT, MICHIGAN, ASSIGNOR, BY MESNE ASSIGNMENTS, TO COPEMAN LABORATORIES COMPANY, OF FLINT, MICHIGAN, A CORPORATION OF MICHIGAN.

MOLDING APPARATUS.

Application filed July 11, 1925. Serial No. 42,880.

This invention relates to a molding apparatus and has for its object a construction of a collapsible mold which may be very quickly set up.

One of the uses of this molding apparatus is the molding of a refrigerator of cast stone. The material I use in the stone is oxy-chloride cement, composed of a mix of about 20% of magnesium chloride, 30% of finely ground silica and 50% of 50-mesh silica sand. To this dry mix is added sufficient magnesium chloride in solution to form a good pouring mix. I preferably utilize this molding apparatus for making a refrigerator of a construction as shown in my co-pending application Serial No. 732,677, filed August 18, 1924, in which the refrigerator is composed of a wooden inner and outer shell secured together in spaced relation and has a coating of this oxy-chloride cement molded on the outside surface of the outer shell and on the inside surface of the inner shell.

With such a refrigerator construction, it is quite necessary that the wooden shell structure should be accurately centered in the mold and one of the features of this molding apparatus is the automatic centering of this refrigerator shell in the molding apparatus. This shell must be spaced from the outer mold section of the molding apparatus and inner cores very accurately, so that a uniform coating of stone will be cast on to the shell.

Among the different features are the means for moving the inner mold section which carries the cores into position and correctly centering the cores in place.

Another object is the means whereby the sub-cores may be moved into place by a manually controlled means, said subcores being correctly positioned automatically which obviously relieves the workman from the task of correctly centering these subcores by hand, as is now the practice.

In the drawings:

Fig. 7 is a detail sectional view showing a modified form of construction.

Figure 1:
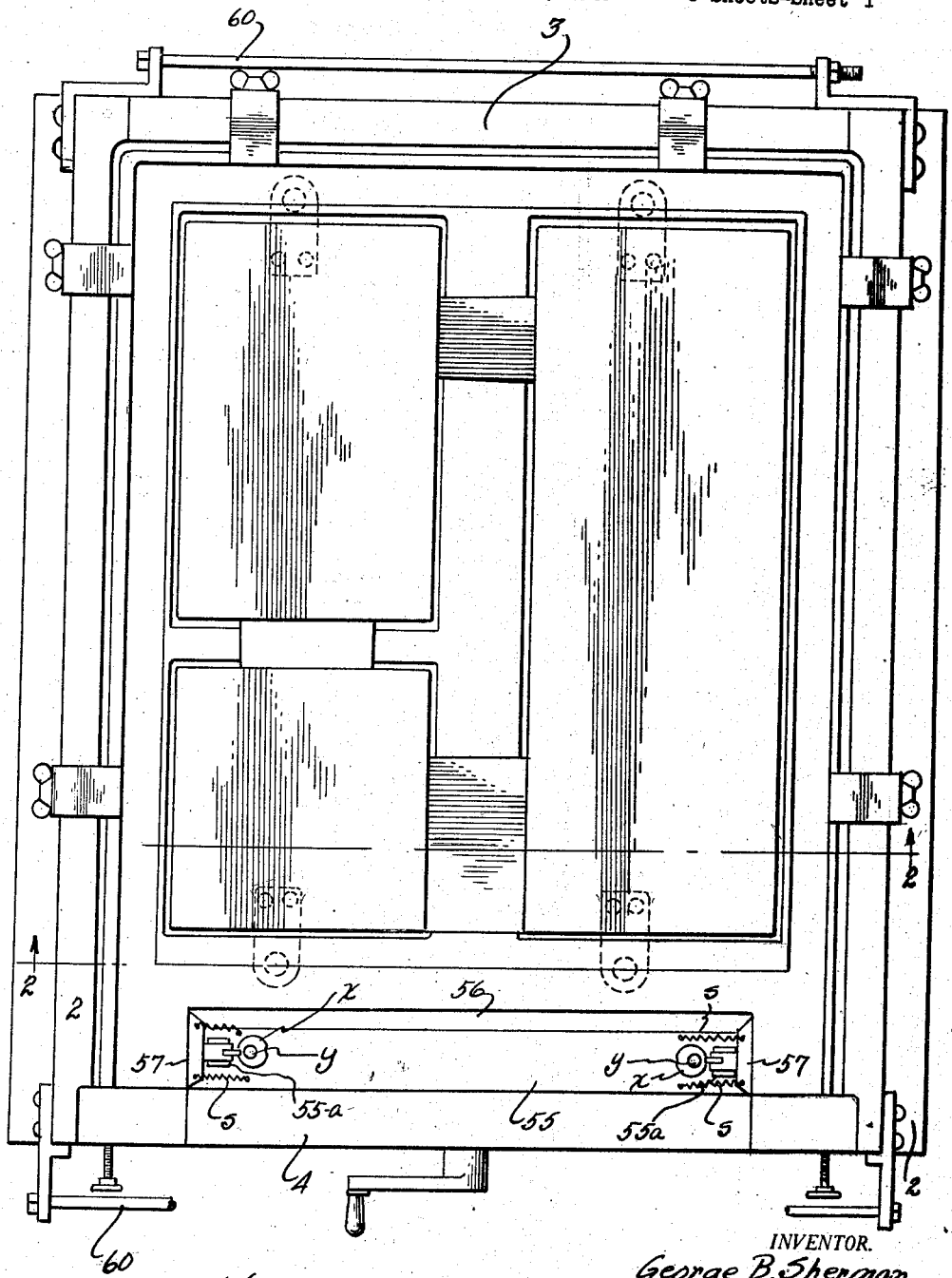
Fig. 1 is a plan view of the molding apparatus.

This molding apparatus consists of a table 1, which supports practically all the actuating mechanism of the apparatus and also supports the two mold sections. The outer mold section consists of the side walls 2 and the end walls 3 and 4 respectively. These side walls and the end wall 4 are hinged to the table 1 at 5 and these walls, when in their upright position, abut against the bottom wall 6 of the outer mold section. This bottom wall is provided with a large opening 7 in which the closure or core plate is fitted. The closure plate is provided with tapered side edges which will tightly fit into the tapered socket of the bottom wall 6. Lugs 8, secured to the core plate, overlap the bottom wall and limit the upward travel of the closure plate so that the core plate is stopped when the upper surface is just flush with the inside surface of the bottom wall. Secured to this closure plate are a plurality of cores 9. Obviously if so desired, a smaller number or one core only may be used.

Figure 2:
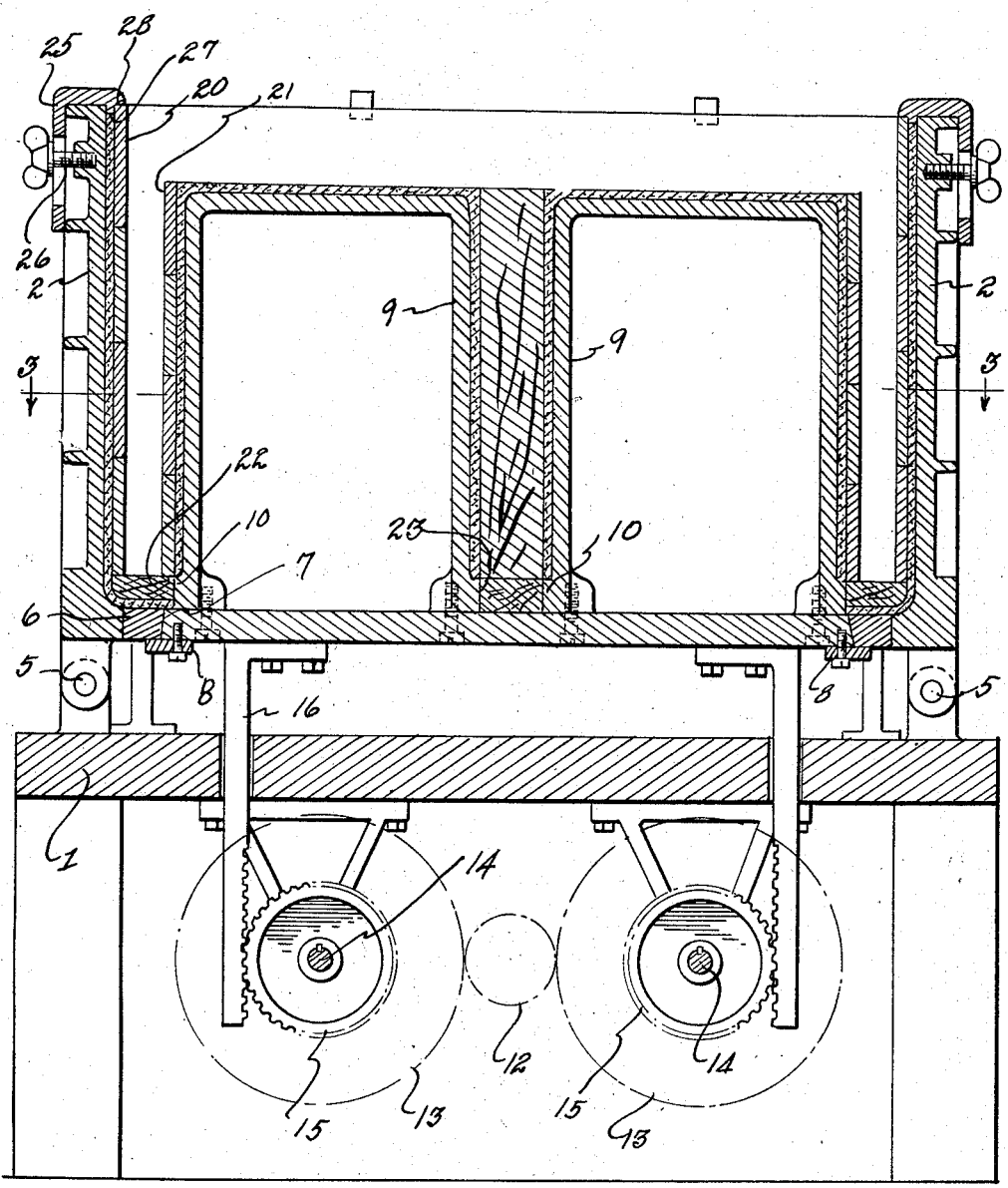
Fig. 2 is a section on the line 2—2 of Fig. 1.

In the construction shown in Fig. 2, cores are provided with the projecting flange 10 near the base, adjacent to the core plate for a purpose which will later be described. To raise and lower the inner mold section which consists of these cores and the core plate, I provide a crank handle 11 which actuates the pinion 12, which in turn meshes with the large gears 13. These gears 13, are keyed to the drive shaft 14, which in turn have keyed thereto the gears 15. Any number of these gears may be mounted on the shaft 14; and carried by the core plate are a number of depending racks 16 which are engaged by the gears 15. Upon actuating the handle 11, the core plate or inner mold section in its entirety may be raised or lowered.

I have shown a wooden refrigerator shell structure which consists of an outer shell 20 and inner shell 21. These shells are secured toegther in spaced relation and are provided with the front wall 22 which is provided with a plurality of door openings 23. These door openings are very accurately formed in the shell; the entire shell structure being accurately gauged so as to fit the mold.

The first step in assembling the shell structure in the molding apparatus, is to place this shell structure in the mold so that the walls of the shells overlie the cores 9, and the front wall rests on the bottom wall of the outer mold. The hinged walls of the outer mold are now swung to an upright position and locked in such position by the tie bolts 60, Fig. 1. The centering clamps 25 which are secured to the side walls by means of the wing nuts 26 are swung into position. Now the inner mold section is raised, carrying with it the cores 9. The flanges or projected portions of the core which we have designated 10 are arranged to frictionally engage the side of the door openings in the shell and raise the entire shell structure upon the raising the inner mold section. These centering clamps 25 are so arranged that the space lugs 27 are arranged to drop in over the ridge of the side wall and fit the wood shell and the side wall. These will correctly space the wooden shell structure from the outer mold section. In Fig. 1 I show how these centering clamps are located. I use six in all, two on each side and two on one of the ends. These centering clamps are also provided with a stop shoulder 28 which engages the back of the wooden shell structure and which limits the upward travel of this wooden shell when the same is moved by engagement with the moving inner mold section. The stopping of this shell structure at a predetermined point accurately spaces the front 22 of the shell from the bottom mold walls 6 and permits the stone to flow down into the bottom of the mold and cover the front of the refrigerator, up to the door openings. The cement is also poured in the space between the wooden shell and the cores for forming a stone coating on the inside of the food chambers of the refrigerator.

In Fig. 7 I show a modified view of the core construction in which the wooden shell is provided with the front 22ª and the outer shell 20ª and the inner shell 21ª and the core 9ª is provided with a straight inside face without the flange 10 as shown in the preferred form of construction. In this case the inner shell 21ª is set back so that the stone which flows in between the inner shell 21ª and the core 9ª stops when it reaches the back of the front wall 22ª. This form is the same in principle as shown in the other figures, the core engaging the side of the door openings in the front wall in the same manner as before and raising the same the correct distance so that the front of the shell will be correctly spaced from the bottom wall of the outer mold section.

Figure 4:
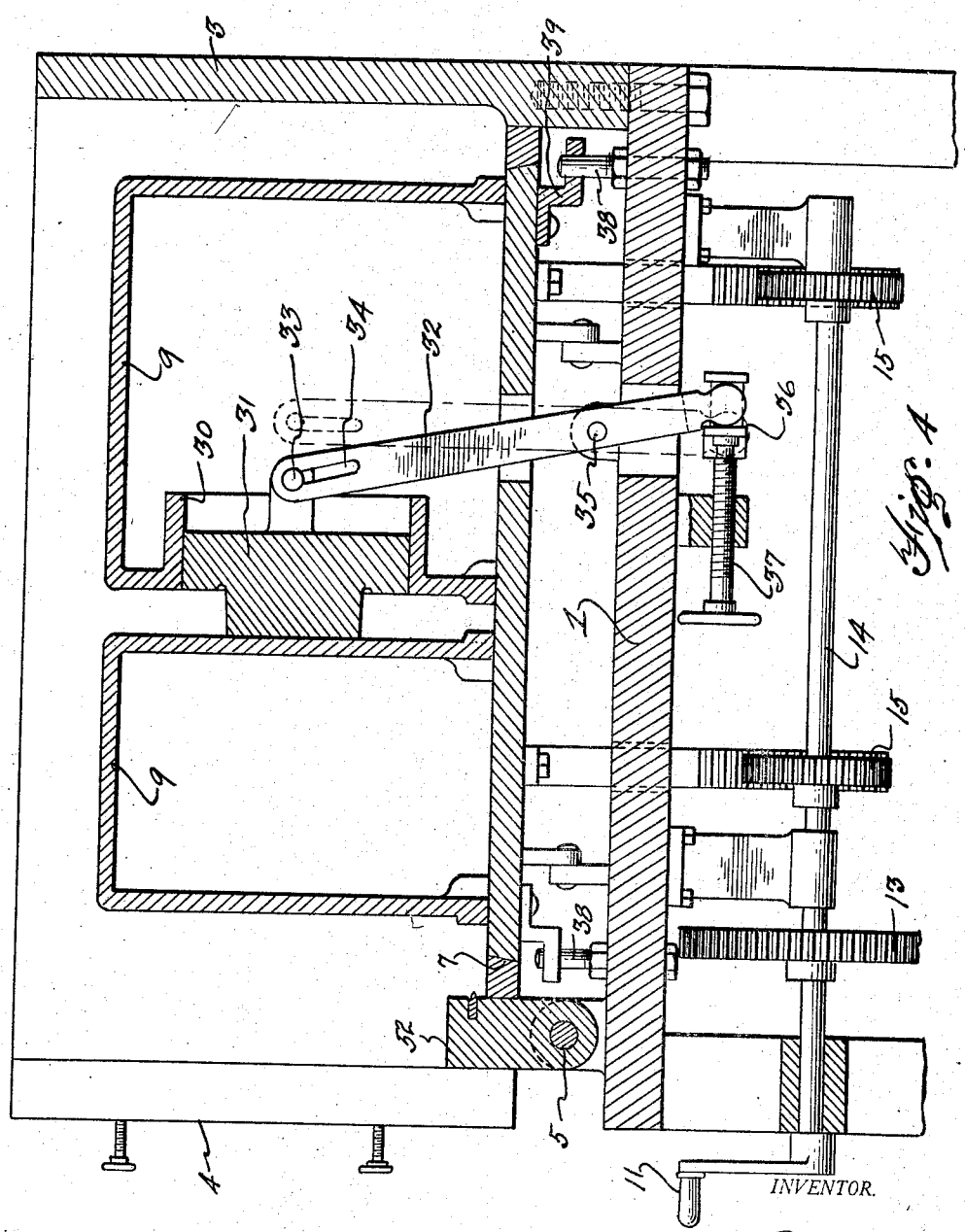
Fig. 4 is a section on the line 4—4 of Fig. 3.

The wooden shell is now assembled in the mold and accurately centered and spaced from the walls of the outer mold sections and cores of the inner mold section. The next step is to insert the subcores for closing the gap at certain points between the cores, for the purpose of providing passage-ways in the final product which connect the food chambers with each other. Fig. 4 shows this very well. Supported by the guides 30, and carried by the cores 9 is the subcore 31. This subcore is connected to a lever 23 by pivotally securing the same thereto as at 33. The lever 32 is slotted as at 34 to provide clearance for relative movement between the subcore and lever. This lever is pivoted to the table 1 at 35 and the lower end of the lever is engaged by the yoke 36 carried by the screw 37 which is preferably manually controlled. This lever being supported on the table plenty of clearance must be had at the point where the same is secured to the subcore so as to permit of movement of the inner mold section to permit the same to drop, as this inner mold section moves relative to the table, being guided in such vertical movement on the guide pins 38 carried by the table. The core plate is provided with the ears 39 which are preferably 4 in number; these ears are provided with drilled holes which engage the guide pins 38. Fig. 4 shows one of the subcores which may be projected between the face of the core and abut against the adjacent core by turning the screw 37. The subcore 31ª is guided in one of the cores and actuated in the same way as is the subcore 31. The lever 32ª, connecting the subcore with a manually controlled actuating means identical with the actuating means above described for moving the subcore 31.

The subcore 40 is secured in the mold in a different manner. The core 40 is fitted into a corresponding opening in the wooden shell before the shell is dropped into the mold. This core is provided with the centering slot 41 and a centering key 42 is forced into the center of the slot and accurately locates this core with respect to the shell structure. This centering key is actuated by the lever 43 which is moved by a manually controlled actuating means 44 which is similar in construction to the other subcore actuating means.

The stone which is poured into the mold on the outside surface of the outer wood shell needs to be stopped at the bottom of the refrigerator, it not being necessary to have a stone coat on the bottom of the refrigerator, as this is never in view.

Figure 3:
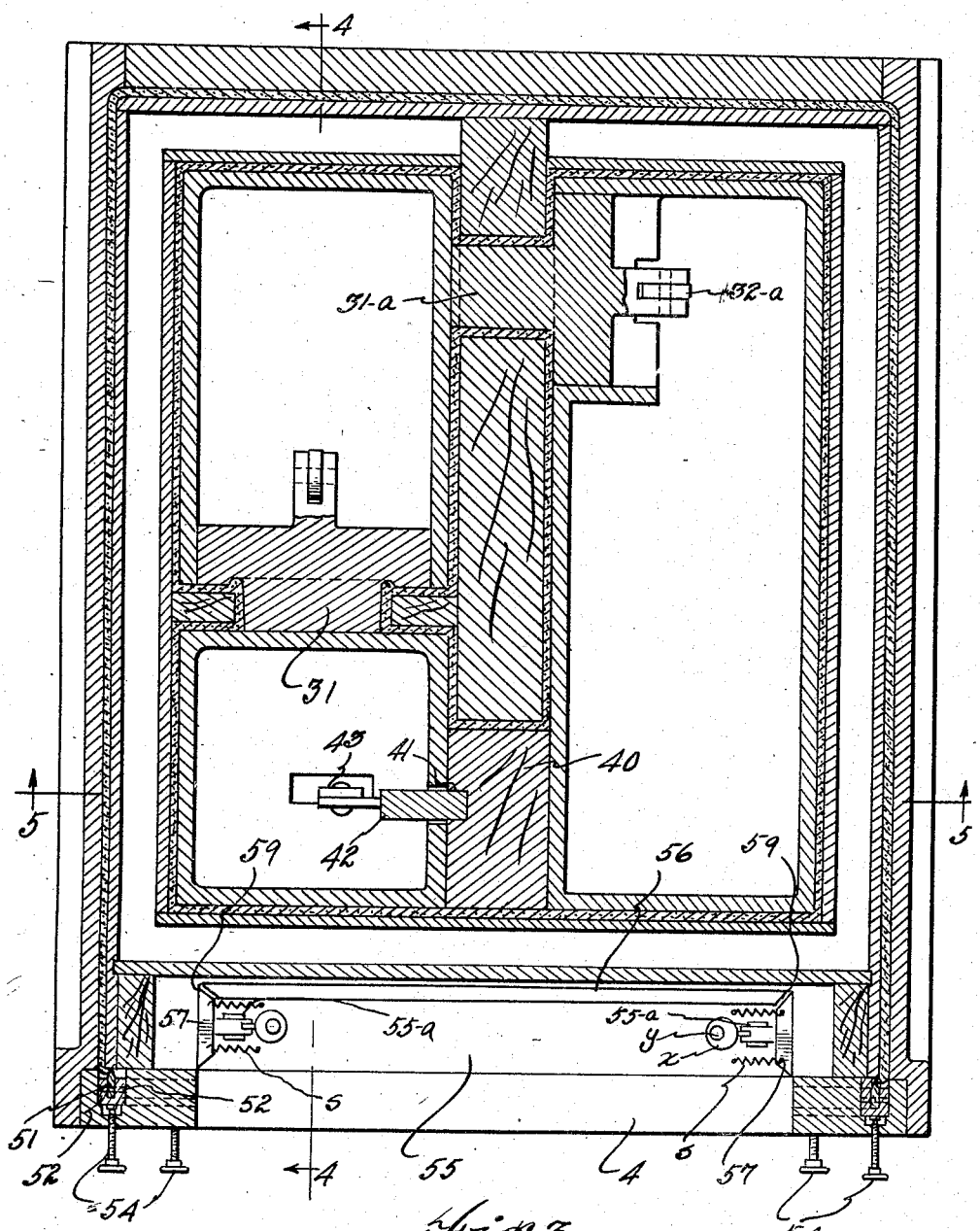
Fig. 3 is a section on the line 3—3 of Fig. 2.

The end wall 4 of the outer mold section is hinged to the base or table support 1 as at 5. This end wall 4 carries the knives 51 Fig. 3 which are carried by the blocks 52 movably guided in the recess 53 in the end wall 4. The adjusting screws 54 may be turned in and bear against this block 52 and force the knives 51 into engagement with the wooden shell. This is clearly shown in Fig. 3 and because of the fact that these knives are relatively sharp, they are practically imbedded in the wood. The stone poured into the mold cannot flow beyond this point as these knives make a very effective seal.

The front wall of the refrigerator is provided with a cut away portion which permits the mounting of a swinging apron to the refrigerator front, which may be swung out of the way when it is desired to remove the drip pan from beneath the refrigerator. It is desired to stop the stone also at this point also and I obtain this seal by providing an extended knife support 55 (Fig. 3) in the end wall 4. This knife support carries the knife 56 which engages the upper ridge of the cut away portion in the front wall of the refrigerator shell. The inside edges of said cut away portion are engaged by the knives 57 which are slidably supported by guides 55ª carried by the support 55, the same being moved outwardly in any suitable manner, but here shown as being moved by the eccentric cams $x$ manually turned through the handle $y$. As the front or end wall 4 of the outer mold section is swung to an upright position, these knives 51 and 56 engage the edge of the wood refrigerator shell and seal off that part and knives 57 are moved outwardly to engage the side edges of the recessed or cut away portion of the front wall of the refrigerator shell. Any gap at the corners 59 may be sealed by applying plaster of Paris thereto by hand. The knives 57 are yieldingly held in a retracted position by the spring $s$.

Figure 5:
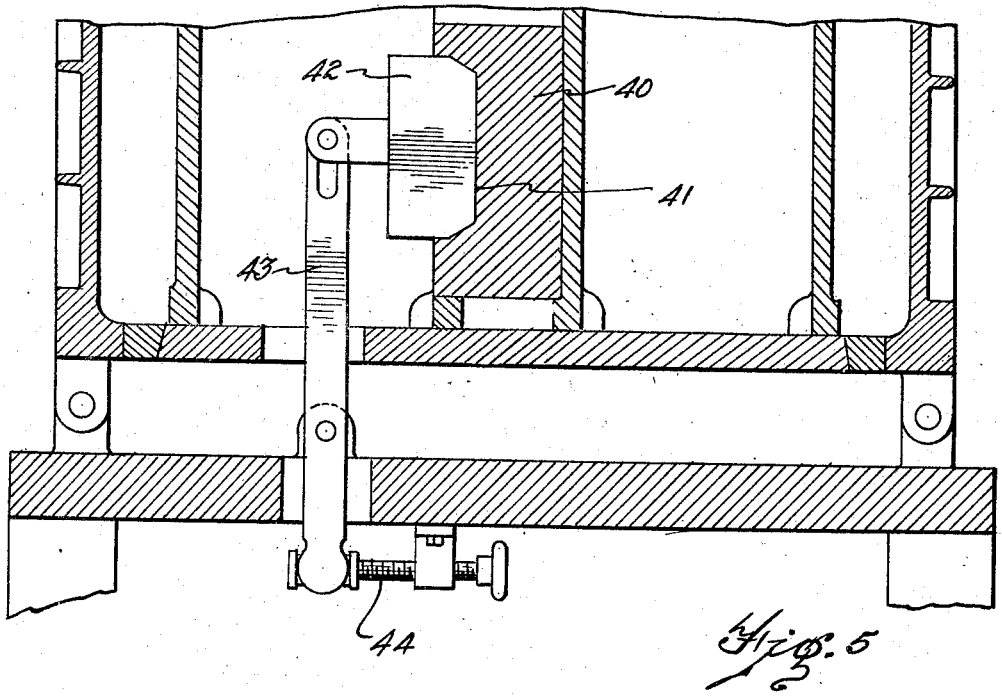
Fig. 5 is a section on the line 5—5 of Fig. 3.
Figure 6:
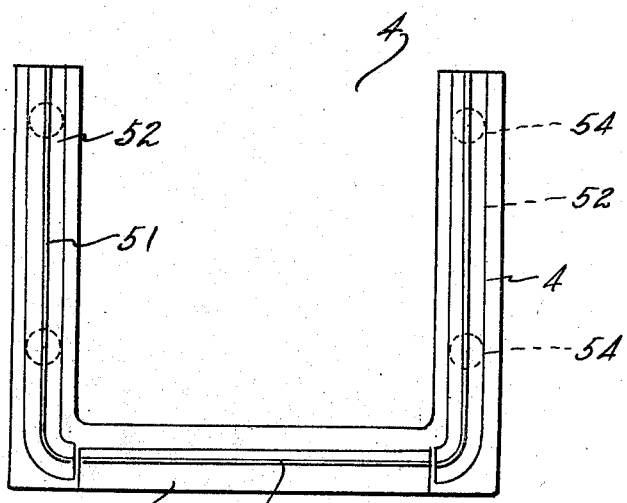
Fig. 6 is a detail of one end wall of the outer mold section showing the knife plates for closing the end of the mold.

These molds may be very quickly set up and prepared for the casting operation. First, one places the two wooden shells which are secured together over the cores 9 and on the core table. The three hinged walls are then raised and locked in place. The centering clamps 25 are carried by the hinged walls into their proper positions. The operator then turns the crank 11 which gradually raises the core table and the cores. As already explained, the cores fitted tightly into the openings in the front wall, and thereby grabbing the wooden shell structure and raising it until the centering clamps stop the upward movement of the shell structure. Also the members 8 strike the frame 6 and then the operator turns the hand wheel and screw 37 to move the sub-core 31 against the companion core. Similarly the sub-core 31ª is projected in place. Before the shells have been laid over the cores the operator has placed the sub-core 40 in the lower air passageway of the shells; consequently he may now operate the hand wheel and screw 4 (see Fig. 5) to force the key 42 into the key socket 41, which correctly centers this sub-core 40.

It now becomes necessary to actuate the devices which cut off the flow of the cement, the parts where it is desirable not to have the stone coating. When the wall 4 is raised or is swung upwardly and locked to its companion walls the knives 51 impinge into the wooden structure, thereby cutting off the flow from the bottom wall of the shell. The knives 56 and 57 are also engaged. The shell structure is now accurately centered and positioned in the mold and is ready for the casting operation.

After pouring, the cement is allowed to harden at which time the refrigerator may be removed from the mold. The space between the inner and outer shells may be filled with any suitable insulating material.

What I claim is:

1. An apparatus for molding the shell structure of a refrigerator comprising the combination of a collapsable outer mold section, a movable inner mold section having cores for forming the several compartments of the refrigerator, a sub-core movably supported by one of the first named cores, and means for moving this sub-core to bridge the space between two of the first named cores so that a passageway is formed between two refrigerator compartments.

2. In a molding apparatus, the combination of a support, an outer mold section carried by said support and provided with an opening in the bottom wall, the edges of said opening being tapered, an inner mold section comprising a centering plate having tapered sides, and a plurality of cores each secured to said closure plate, the inner mold section movably supported by said support and means for moving said inner mold section to position the cores within the outer mold and move the closure plate into the opening in the bottom wall, the tapered engagement of the closure plate and opening providing a tight seal between said plate and bottom wall for preventing the molding material from escaping at the joint.

3. In a molding apparatus, the combination of a support, an outer mold section carried by said support, an inner mold section carried by said support and including one or more cores, and means carried by said mold sections for supporting a shell in spaced relation with respect to said outer mold section and cores.

4. In a molding apparatus, the combination of a support, an outer mold section carried thereby, an inner mold section carried by said supports, means for supporting a shell between said mold sections and in spaced relation with respect to the bottom wall of the outer mold section and means at the top of the mold for spacing said shell with respect to said mold sections.

5. In a molding apparatus, the combination of a support, an outer mold section carried thereby, an inner mold section movably supported by said support and provided with one or more cores; said mold sections spaced with respect to each other to permit the insertion of a shell therebetween having one or more openings, the cores of said inner mold section arranged to fit in the openings of the shell and provided with a portion which engages said shell to raise the same off the bottom wall of the outer mold section upon movement of the inner mold section, and additional means for spacing the shell from the side walls of the outer mold section and cores and for limiting the upward movement of the shell to correctly space the shell from the bottom wall of the outer mold section.

6. In a molding apparatus, the combination of a support, an outer mold section carried thereby, an inner mold section movably supported by said support and provided with one or more cores, said mold sections spaced with respect to each other to permit the insertion of a shell structure therebetween having one or more openings, the cores carried by said inner mold section arranged to fit in the openings of the shell and provided with an enlarged flanged portion which frictionally engages the side walls of the openings in the shell to raise the same off the bottom wall of the outer mold section upon movement of the inner mold section, and additional means for spacing the shell from the side walls of the outer mold section and cores and for limiting the upward movement of the shell to correctly space the shell from the bottom wall of the outer mold section.

7. In a molding apparatus, the combination of a support, inner and outer mold sections supported thereby, the inner mold section provided with a plurality of cores, subcores slidably supported by the first mentioned cores and permitted to be projected beyond the face of the core by which it is supported to close the gap between two adjacent cores, and actuating means for moving said subcores.

8. In a molding apparatus, the combination of a support, inner and outer mold sections supported thereby, the inner mold section provided with a plurality of cores, subscores slidably supported by the first mentioned cores and permitted to be projected beyond the face of the core by which it is supported to close the gap between two adjacent cores, and manually actuated means for moving said subcores.

9. In a molding apparatus, the combination of a support, inner and outer mold sections supported thereby, the inner mold section provided with a plurality of cores, subcores slidably supported by the first mentioned cores and permitted to be projected beyond the face of the core to close the gap between two adjacent cores, a lever pivoted to said support and connected at one end to the subcore by a slot and pin connection, and a manually controlled actuator carried by the said support and connected with said lever for the purpose of providing a manual control for moving the subcore.

10. In a molding apparatus, the combination of outer and inner mold sections, secured together in spaced relation to permit the insertion of a shell structure therebetween in spaced relation with respect to said mold sections to permit the molding of a covering for said shell on the outside and inside thereof, strips having relatively sharp knife edges movably supported by one of said mold sections, and means for moving said strips to force the knife edges against said shell to close one end of the mold and prevent leakage.

11. An apparatus for molding the shell structure of a refrigerator comprising the combination of a collapsible outer mold section, an inner mold section having cores for forming the several compartments of a refrigerator and a subcore adapted to be placed in a position to bridge the space between two of the first named cores in order that a passageway will be cast between two refrigerator compartments, this subcore being removable to permit the molded shell to be removed from the cores, and means for removing the subcore.

12. An apparatus for molding plastic material in the form of a shell structure for a refrigerator comprising the combination of an outer mold section, an inner mold section including cores for forming the several compartments of the refrigerator, movable subcores for forming passageways between the several compartments, and means for stopping the flow of plastic material in the outer mold sections so that the bottom of the refrigerator is not included in the shell structure.

13. An apparatus for molding plastic material in the form of a shell structure for a refrigerator comprising the combination of an outer mold section, an inner mold section including cores for forming the several compartments of the refrigerator, movable subcores for forming passageways between the several compartments, means for stopping the flow of plastic material in the outer mold sections so that the bottom of the refrigerator is not included in the shell structure, and means for stopping the flow of material in the outer mold section for providing an opening for the mounting of a swinging apron to the front of the refrigerator.

In testimony whereof I have affixed my signature.

GEORGE B. SHERMAN.